United States Patent [19]
Kullick et al.

[11] Patent Number: 5,751,997
[45] Date of Patent: May 12, 1998

[54] METHOD AND APPARATUS FOR TRANSFERRING ARCHIVAL DATA AMONG AN ARBITRARILY LARGE NUMBER OF COMPUTER DEVICES IN A NETWORKED COMPUTER ENVIRONMENT

[75] Inventors: Steven E. Kullick, Saratoga; Charles S. Spirakis, Santa Clara; Diane J. Titus, Cupertino, all of Calif.

[73] Assignee: Apple Computer, Inc., Cupertino, Calif.

[21] Appl. No.: 588,830

[22] Filed: Jan. 19, 1996

Related U.S. Application Data

[63] Continuation of Ser. No. 7,159, Jan. 21, 1993, abandoned.

[51] Int. Cl.[6] .................. G06F 12/16; G06F 12/08
[52] U.S. Cl. .................. 395/489; 395/444; 395/200.08
[58] Field of Search .................. 395/600, 488, 395/489, 200.08, 182.02, 182.04, 474, 439–441, 415–419, 444, 180, 182.18, 182.03

[56] References Cited

U.S. PATENT DOCUMENTS

| | | | |
|---|---|---|---|
| 5,133,065 | 7/1992 | Cheffetz et al. | 395/181 |
| 5,218,695 | 6/1993 | Noveck et al. | 395/621 |
| 5,239,647 | 8/1993 | Anglin et al. | 395/621 |
| 5,263,154 | 11/1993 | Eastridge et al. | 395/182.04 |
| 5,276,860 | 1/1994 | Fortier et al. | 395/182.04 |
| 5,276,867 | 1/1994 | Kenley et al. | 395/600 |
| 5,313,631 | 5/1994 | Kao | 395/600 |
| 5,341,493 | 8/1994 | Yanai et al. | 395/488 |
| 5,367,698 | 11/1994 | Webber et al. | 395/800 |
| 5,386,545 | 1/1995 | Gombos, Jr., et al. | 395/620 |

FOREIGN PATENT DOCUMENTS

| | | |
|---|---|---|
| 0216170 | 4/1987 | European Pat. Off. . |
| 0 259 912 A1 | 3/1988 | European Pat. Off. . |
| 0259912 | 3/1988 | European Pat. Off. . |
| 0332210 | 9/1989 | European Pat. Off. . |
| 0359384 | 3/1990 | European Pat. Off. . |
| WO92014204 | 1/1992 | WIPO . |
| 9214204 | 8/1992 | WIPO . |

OTHER PUBLICATIONS

Backup combination, Midrange Systems, v5, n3, p. 75(1), Feb. 4, 1992.

Dern, Daniel P., LANs bring new problems, solutions to file backup and recovery, MIS Week, v11, n23, p. 26(2), Jun. 4, 1990.

(List continued on next page.)

*Primary Examiner*—Matthew M. Kim
*Attorney, Agent, or Firm*—Helene Plotka Workman

[57] ABSTRACT

A method and apparatus for storing on centralized mass storage devices archival data from multiple computers in a networked environment. In a networked computer system having a communication network interconnecting one or more computers and a storage unit, parallel processes are created to perform repeated backup operations for disks on computer devices on the communication network. The backup operations for a disk include a backup initialization which occurs when a primary storage device does not have a full index or a backup data file for a disk but a secondary storage device does. During a backup initialization, data from the files and directories on that disk along with an index entry for each file or directory are passed to the primary storage device which directly passes that information directly through to the secondary storage device. The index entries are incorporated into a full index and the data is incorporated into a backup data file. During a backup cycle, the computer device is incrementally backed up to a primary storage device such that the primary storage device contains a full index with an entry for each file and directory on the disk and a backup data file for the disk with data for the files and directories which have been changed or created since the last backup to the secondary storage device occurred. When a specified, predetermined time or event occurs or the transfer is otherwise indicated, the primary storage device transfers the full index and the backup data file to the secondary storage device.

19 Claims, 10 Drawing Sheets

OTHER PUBLICATIONS

Michele Dostert, NetWare tools, equipment promise better automation in LAN backup, Computerworld, p. 63, Sep. 14, 1992.

GigaTrend Server Provides Network—Ready Backup, Lan Times, v9, issue 22, p. 24, Nov. 23 1992.

Dat Storage: Gigatrend Ships Backup Software for Multiple Lans & Wans at 50 Megabytes Per Minute, Edge Work-Group Computing Report, v3, n117 Aug. 17, 1992.

"Retrospect Remote Premier Network Backup Software for the Macintosh, User's Guide", Dantz Development Corporation Berkeley, CA, 1989, 1990, 1991, 1992, 1993, pp. 11–13, 21–28, 45–49, 63–66.

"Retrospect Remote Powerful Backup Software for the Macintosh, User's Guide", Dantz Development Corporation, Berkeley, CA, 1989, 1990, 1991, 1992, 1993, pp. 15–18, 25–85, 187–194.

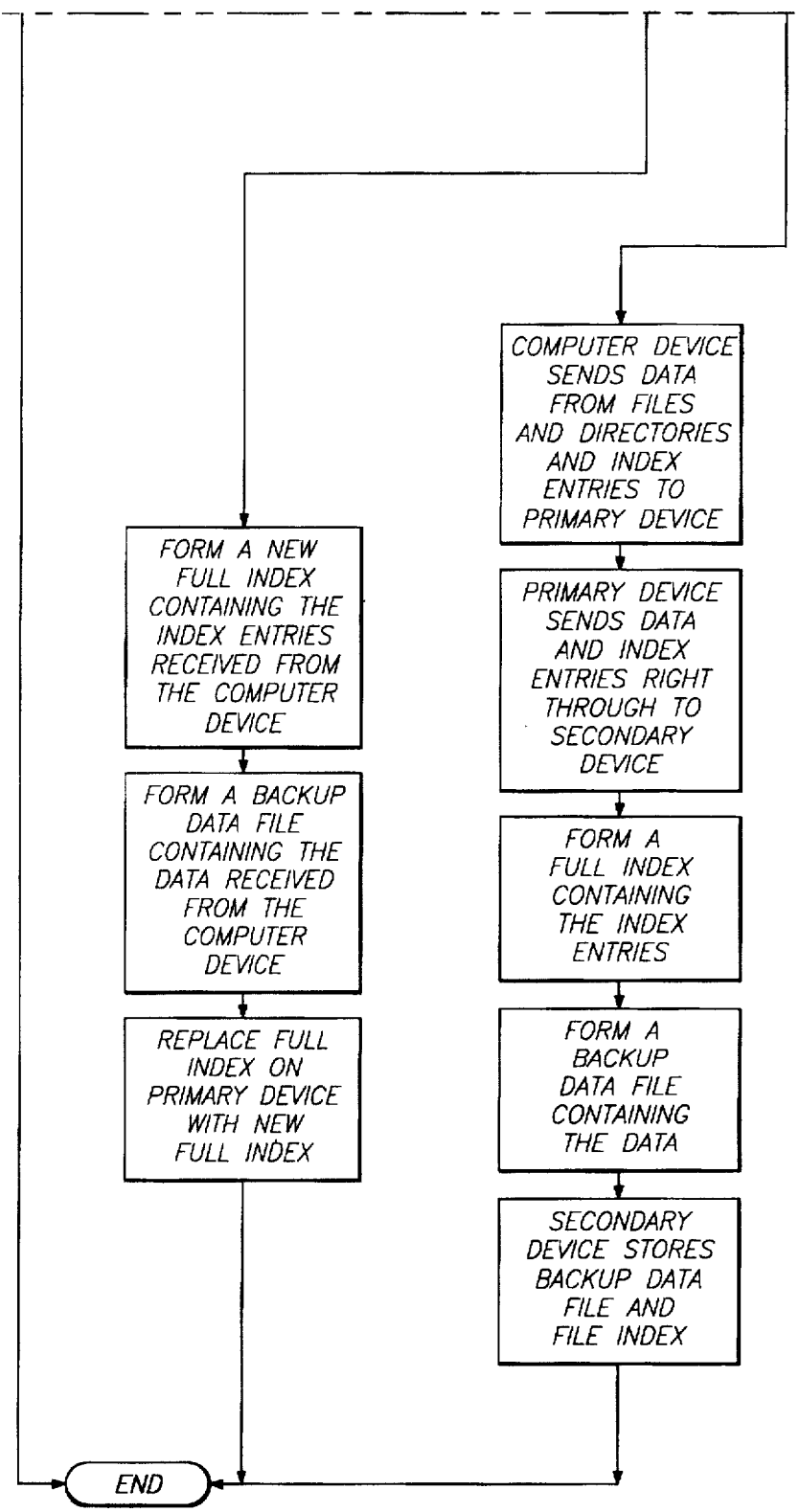

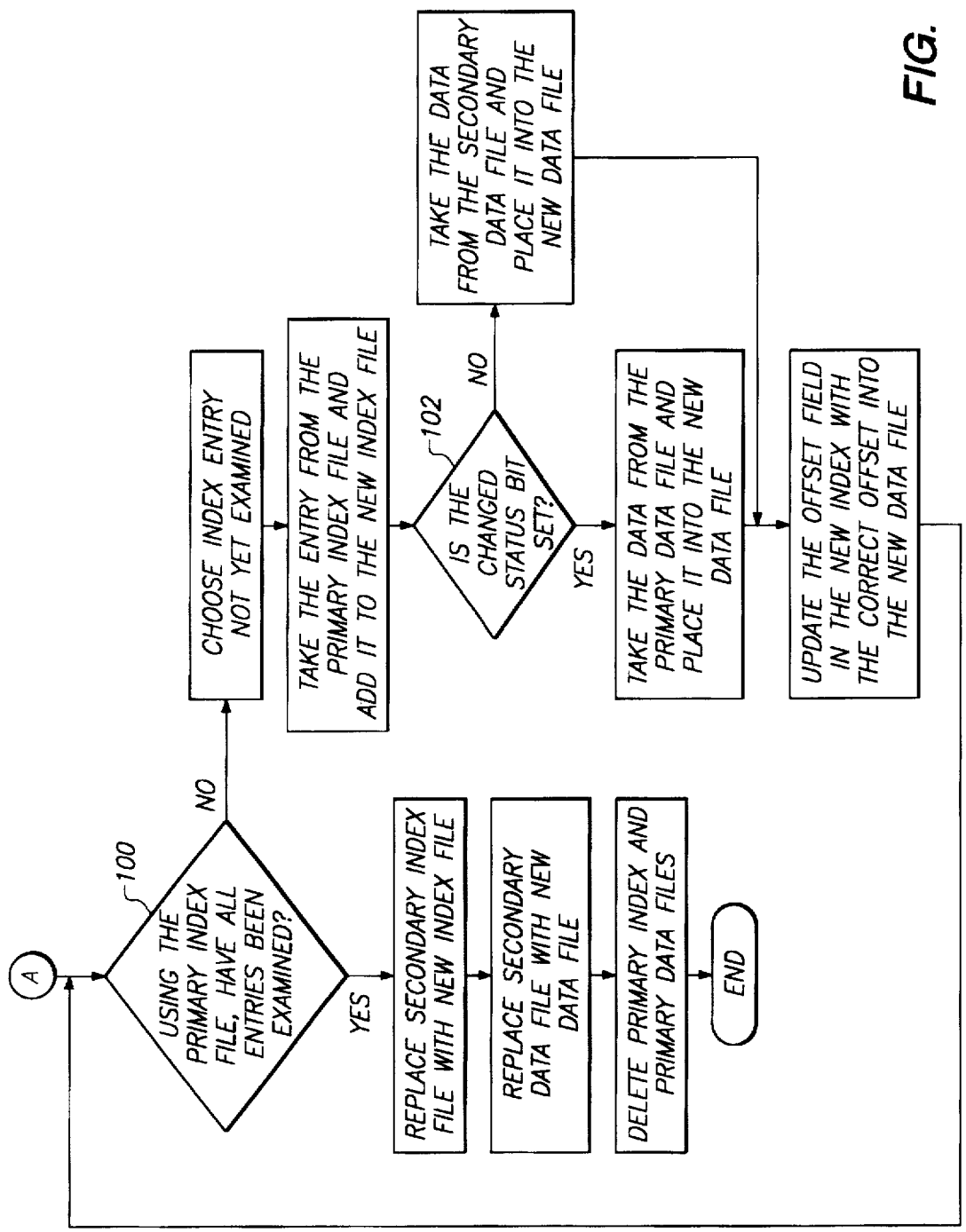

METHOD AND APPARATUS FOR TRANSFERRING ARCHIVAL DATA AMONG AN ARBITRARILY LARGE NUMBER OF COMPUTER DEVICES IN A NETWORKED COMPUTER ENVIRONMENT

This is a continuation of application Ser. No. 08/007,159, filed Jan. 21, 1993, now abandoned.

RELATED APPLICATION

This application is related to co-pending application entitled "METHOD AND APPARATUS FOR DATA TRANSFER AND STORAGE IN A HIGHLY PARALLEL COMPUTER NETWORK ENVIRONMENT", U.S. patent application Ser. No. 08/006,550, filed concurrently herewith on Jan. 21, 1993, which was commonly assigned or subject to an obligation of assignment to the same person at the time of invention.

FIELD OF THE INVENTION

This invention relates generally to large scale computer archival storage mechanisms and more specifically to a method and apparatus for storing archival data from multiple personal computers in a networked environment.

BACKGROUND OF THE INVENTION

Backup storage devices may provide low cost storage onto which computers connected to the storage devices can create archival or backup copies of their files for later recovery if the original files are lost or corrupted. Typically, data is copied first from a computer to a primary storage device and subsequently from the primary storage device to a lower cost, higher density secondary storage device such as a magnetic tape or optical disk. This is commonly known as "backing up" the system. The high speed storage device and the tapes or optical disks may be stored in a safe, protected environment to minimize the risk of damage or loss of the data stored therein.

Typically, a full backup of a computer device is followed by one or more incremental backups. An incremental backup archives data which has been changed or created since the last backup, incremental or full.

In an environment where there are multiple personal computers networked together, it is burdensome to backup each computer individually because a backup of a computer is usually initiated by a person. At times that person may forget to backup a computer and if that data has been lost or corrupted, it may be irretrievable, because it has not been archived. Typically, an administrator oversees the backup of the computers to check that each machine is backed up on a regular basis. Thus, this approach is labor intensive and burdensome.

In some prior backup systems, a personal computer is backed up by physically connecting the computer to a storage device such as a tape drive. An administrator then controls the transfer of data from the computer to the storage device. After the backup operation is completed, the storage device is disconnected from the computer. This prior backup system is also labor intensive because for each complete backup operation a person physically connects and disconnects the computer with a storage device and, also, controls the data transfer. Where multiple personal computers are involved, this backup system can be extremely burdensome. Moreover, during the backup of a computer, the computer's resources are dedicated primarily to the backup operations and, thus, are unavailable to perform other functions. Finally, a large quantity of computers can not be backed up regularly and automatically.

In some other prior backup systems, a computer, i.e. file server, is dedicated to backing up the data from the other computers on the network. Each computer on the network initiates a connection to the file server and controls the transfer of data from that computer to that file server. In some of these prior systems, a personal computer can specify a particular time at which the backup operation should begin.

These systems present several problems. First, the storage capacity of the file server or the tape robots or optical disk units attached to the file server must be equal to or greater than the combined amount of storage space on the personal computers being backed up. Thus, the number of personal computers that may be backed up is limited by the storage capacity of the file server and attached units. Second, adding a computer to the file server typically requires some overhead such as the changing of parameters. Third, since the backup operations are done in serial order, i.e. once a backup operation begins on a first computer, it must complete before a backup operation can begin on a second computer, a computer being backed up is primarily dedicated to the backup operation and, thus, is unavailable to perform other tasks. Fourth, it may be difficult to backup a large quantity of computers automatically and on a regular basis. Fifth, if users of computers choose to be backed up at the same time, it may slow down or overload the system.

SUMMARY OF THE INVENTION

It is a principal object of this invention to provide an apparatus and method for backing up multiple computers to centralized mass storage devices on a regular basis without significant user interaction.

Another object of this invention is to provide an apparatus and method for backing up multiple computers to centralized mass storage devices which does not render a computer unavailable for a substantial amount of time during a backup operation.

Another object of this invention is to provide an apparatus and method for backing up multiple computers to centralized mass storage devices which permit an arbitrary number of computers to be backed up.

Another object of this invention is to provide an apparatus and method for backing up multiple computers to centralized mass storage devices which permit a computer storage device such as a disk to be added to the network or relocated in the network without substantial modification or notification.

This invention provides a method and apparatus for backing up data stored on multiple computers in a networked environment to centralized mass storage devices. Briefly, according to the invention, in a computer system having a communication network interconnecting one or more computers and a storage unit, parallel processes are created to perform repeated backup operations for disks on computer devices on the communication network. A storage unit may be a single storage device capable of executing a plurality of processes or one or more primary storage devices connected to one or more secondary storage devices. When a storage unit is the former, processes are created to perform the backup operations that are described below in relation to a storage unit having one or more primary storage devices and one or more secondary storage devices.

The backup operations for a disk include a backup initialization and repeated backup cycles. A backup initialization occurs when no corresponding full index or backup data file exists for that disk on the secondary storage device. During a backup initialization, a computer device sends a copy of data from the files and directories on that disk along with an index entry for each file or directory to the primary storage device which passes that information directly through to the secondary storage device. The secondary storage device forms a full index containing the index entries from the computer device and forms a backup data file containing the associated data. An index entry contains, among other information, the location of a file or directory on the disk, the date the file or directory was last modified and the location of the associated data in the backup data file.

During a backup cycle, the disk or other storage resource on a computer device is incrementally backed up to a primary storage device such that the primary storage device contains a full index with an entry for each file and directory on the disk and a backup data file for the disk with data for the files and directories which have been changed or created since the last backup to the secondary storage device occurred. When a specified, predetermined time or event occurs or the transfer is otherwise indicated, the primary storage device transfers the full index and the backup data file to the secondary storage device.

At the beginning of a backup cycle, the primary storage device checks if it has a copy of the full index. If it does not, the secondary storage device sends a copy of the full index via the primary storage device to the computer device. Preferably, the primary storage device does not retain a copy of this full index.

The computer device determines for each file or directory on the disk whether it has been modified since the date indicated in the associated entry in the full index as the last date that file or directory was modified. If a file or directory was created after the last backup occurred, i.e. the file or directory was not among those listed by the primary storage device, the file or directory is considered to have been modified since the last backup.

For each file or directory on the disk, the computer device sends an index entry to the primary storage device. The index entry indicates whether that file or directory has been modified or created since the last backup, i.e. since the last modified date for that file or directory indicated by the primary storage device. For each such modified or created file or directory, the data associated with that file or directory is sent from the computer device to the primary storage device. Using the full index and backup data file on the primary storage device, if any exist, and the index entries and data sent from the computer device to the primary storage device, a new full index and a new backup data file are formed describing which files and directories have been changed or created since the last backup to the secondary storage device occurred.

Until a specified, predetermined time or event occurs or a transfer of data from a primary storage device to a secondary storage device is otherwise indicated, the primary storage device sends a full index to the computer device and the computer device sends back index entries and data as described above. However, the primary storage device retains a copy of this full index after sending it to the computer device.

The highly parallel nature of this invention greatly reduces the need to minimize the time taken to perform an individual backup. Therefore, during the backup cycle, other activity on a computer device such as a user using the computer device has priority over backup processes. Thus, the backup operations do not render a computer unavailable for a substantial amount of time. Backup operations occur in the background when a computer device is available and do not significantly disturb users of the computer device.

The invention provides several other advantages. First, since the backup of a disk is initiated by a secondary storage device and the backup operations are performed by parallel processes created by a primary storage device, no administrator is needed to initiate or oversee backup operations. Second, since backup operations occur at random times as determined by the primary storage device, the backups can be scheduled so that the network and storage devices are not overloaded. Third, since there can be multiple primary storage devices, there can be an arbitrary number of computer devices backed up on the computer network.

BRIEF DESCRIPTION OF THE DRAWINGS

The above and further advantages of the invention may be better understood by referring to the following description in conjunction with the accompanying drawings, in which:

FIGS. 6A-6C are flowcharts specifying steps executed during a backup operation of a disk of a computer device.

DETAILED DESCRIPTION OF ILLUSTRATIVE EMBODIMENT

Figure 1:
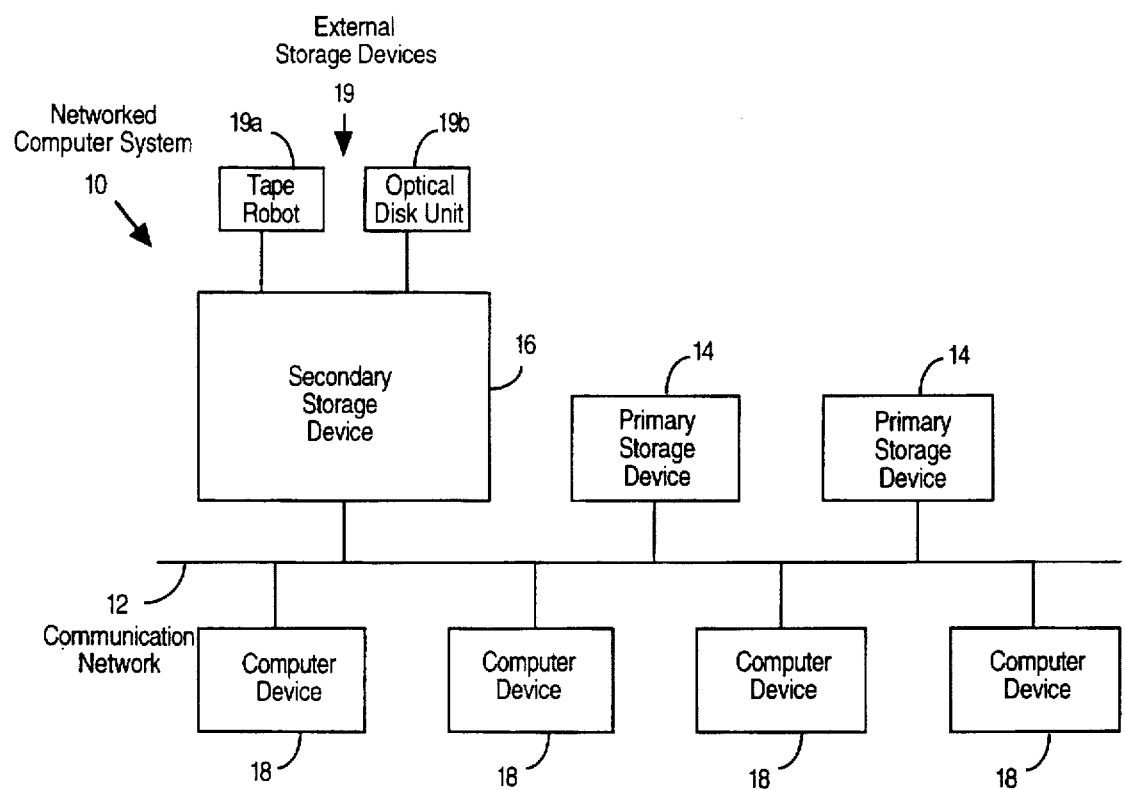
FIG. 1 illustrates a computer backup system in accordance with this invention.

Referring to FIG. 1 of the drawings, reference numeral 10 designates generally a networked computer system having a communication network 12 interconnecting at least one primary storage device 14, at least one secondary storage device 16 and at least one computer device 18. Communication network 12 can be a local-area network, high-speed bus or other interconnecting mechanism for exchanging messages and data, such as AppleTalk, Ethernet or Token Ring.

Storage devices 14 and 16 can each be a specialized storage device designed for the efficient storage, archival and retrieval of data, or can be a computer augmented with greater storage volumes and devices or can be a minicomputer or large computer providing storage service in addition to other functions. Preferably, the secondary storage device 16 is a parallel machine such as a Cray Y-Mp2 E/232 (Cray Research, Cray Research Park, Eagan, Minn.) connecting with one or more external storage devices 19 such as a tape robot 19a or an optical disk unit 19b. A primary storage device may connect with an external memory storage unit (not shown).

Computer device 18 can be any of a personal computer, workstation, minicomputer or large computer, or other specialized computing device or peripheral attached to the communication network.

Figure 2A:
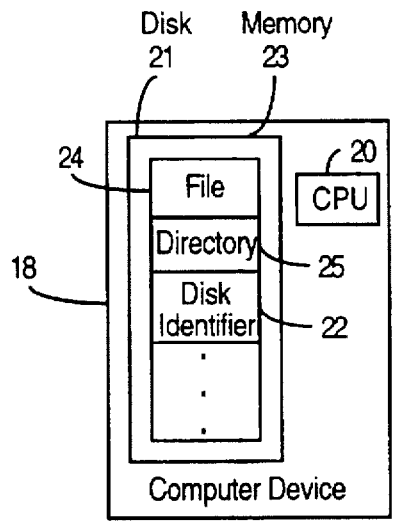
FIGS. 2A-2C show a computer device, a primary storage device and a secondary storage device and, respectively, in a computer backup system of FIG. 1.

FIG. 2A shows a computer device 18 including a CPU 20 and one or more disks 21, each disk having a disk identifier 22 and a memory 23. The disk identifier 22 uniquely identifies that disk and distinguishes it from other disks or storage resources on the network. For example, the disk identifier may be a disk name, disk serial number, an account number, a password or any combination thereof. The disk identifier may also be assigned to a disk by a primary storage device 14. Memory 23 contains one or more files 24 and, preferably, directories 25 or other file organizational structure.

Figure 2B:
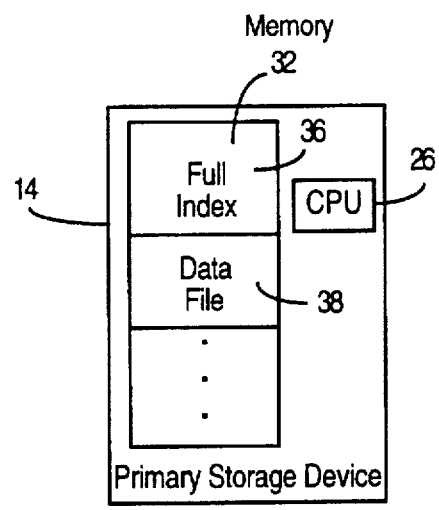
Figure 2C:
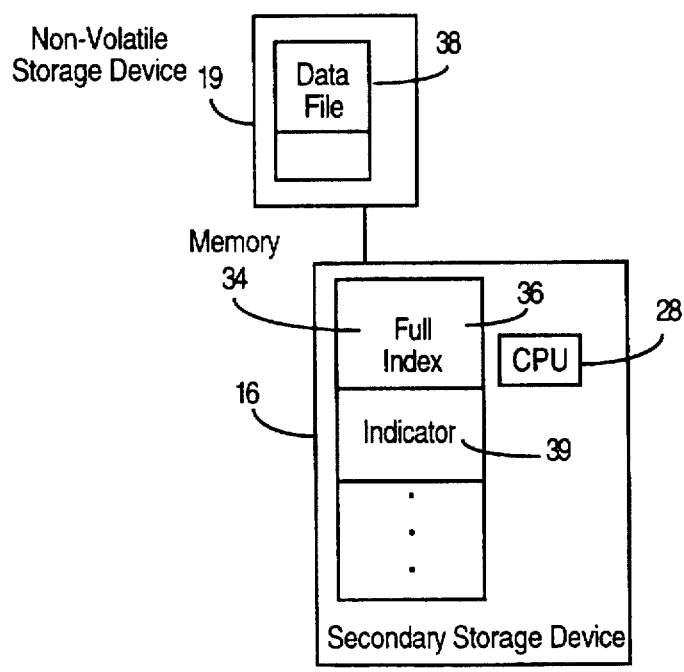

As shown in FIGS. 2B and 2C, storage devices 14 and 16, include central processing units ("CPU"s) 26 and 28 respectively, and memories 32 and 34, respectively. There are two types of memory volatile and non-volatile. Volatile memory is random access memory, or other memory where the contents are erased or otherwise destroyed when the power to the device containing the memory is turned off. On the other hand, the contents of non-volatile memory are maintained even when the power to the device containing that memory is turned off. Examples of non-volatile memory are magnetic and optical disk, magnetic tape, or read-only memory such as ROM or CD-ROM. Memory 32 may be volatile or non-volatile, but memories 23 and 34 are non-volatile memory.

At times, storage devices 14 and 16 may maintain a full index 36 (also called an "index file") and a backup data file 38 (also called a "data file") for each disk 21 being backed up. The backup data file 38 is basically a stream of bytes containing data from the disk 21 being backed up. On the primary storage device 14 the full index 36 and the backup data file 38 are stored in memory 32. Preferably on the secondary storage device 16 the full index 36 is stored in memory 34, while the backup data file 38 is stored on an external non-volatile storage device 19, connected to the secondary storage device. Although memories 32 and 34 may each contain a full index 36 and a backup data file 38, the information in each full index may be different. The full index 36 and backup data file 38 for a disk 21 on the primary storage device 14 contain information about the files and directories on the disk and data for those files and directories on that disk which have been modified since the disk was last backed up on the secondary storage device 16.

Preferably, memory 34 contains a responsible primary storage device indicator 39 for each disk 21 for which it has a full index 36. This responsible primary storage device indicator 39 specifies which primary storage device is responsible for backup operations for that disk 21. The primary storage device which performed the most recent backup operation, as described below, is the primary storage device which is responsible for backing up that disk 21.

Figure 3A:
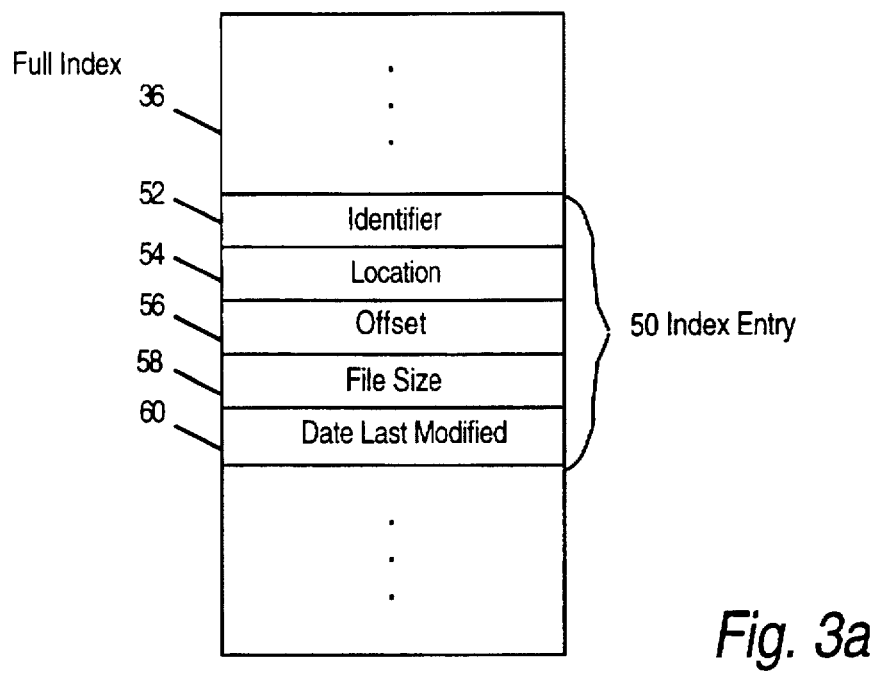
FIGS. 3A and 3B show alternative embodiments of an index entry in accordance with the invention.

Full index 36 may describe a disk 21 or a plurality of disks and contains one or more index entries 50. As shown in FIG. 3, an index entry 50 preferably contains an identifier field 52 (first field), a location field 54 (second field), an offset field 56 (third field), a file size field 58 (fourth field) and a date last modified field 60 (fifth field). The order of the fields within an index entry may vary.

Identifier field 52 identifies the file or directory that is being backed up. For example, identifier field 52 may contain the name of the file or directory.

Location field 54 specifies the location of the file or directory on the disk 21 being backed up. For example, location field 54 may contain the directory pathway of the file or it may contain a pointer to the address of the file in memory 32. Optionally, location field 54 may be replaced by a parent field 53 and a folder field 55 (FIG. 3B), particularly if the file structure on the disk 21 is hierarchical, as in a Macintosh computer ("Macintosh" is a registered trademark of Apple Computer, Inc.).

Offset field 56 indicates the location in the backup data file 38 of the data associated with the file or directory identified in the identifier field 52. For example, if the data begins at byte 80 in backup data file 38, then offset field 56 may be set to 80.

The offset field 56 in an index entry 50 may contain a change status bit 57 to indicate whether a file or directory identified by identifier field 52 in that index entry has been modified. On a primary storage device, a change status bit 57 indicates whether a file or directory has been modified or created since the file or directory was last backed up on the secondary storage device 16. On a computer device, a change status bit 57 indicates whether a file or directory has been modified or created since the file or directory was last backed up on the primary storage device, or in other words, since the full index 36 for the disk 21 containing that file was last modified or updated. Alternatively, the change status bit 57 may be separate from the offset field 56 and may be any means capable of indicating that a file or directory has been modified or created.

File size field 58 indicates the length of the file or directory identified by identifier field 52.

Date last modified field 60 indicates the date and/or time on which the file or directory identified by the identifier field 52 was last modified.

In the invention, it is also possible to have an index entry that has either an offset field 56 or a file size field 58, but not both. Thus, an index entry might consist of an identifier field 52, location field 54, file size field 58 and date last modified field 60. In that case the file size field 58 could contain the change status bit or otherwise indicate that a file or directory has been changed.

Figure 3B:
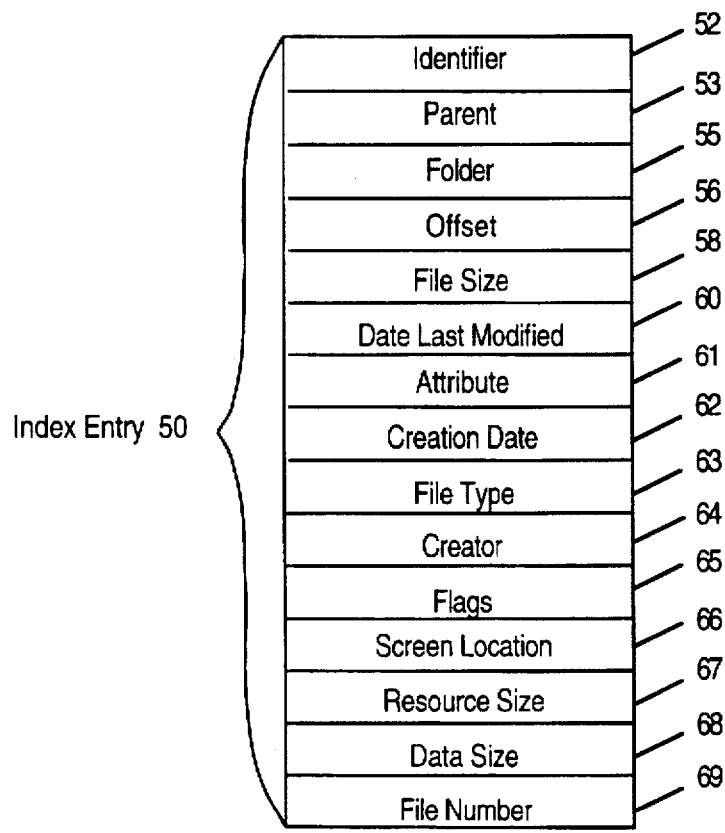

Optionally, as shown in FIG. 3B, the index entry 50 may also contain an attribute field 61, a creation date field 62, a file type field 63, a creator field 64, a flags field 65, a screen location field 66, a resource size field 67, a data size field 68, and a file number field 69. Attribute field 61 specifies attributes of the file, e.g. whether the file is locked. The creation date field 62 specifies the creation date of the file and the file type field 63 specifies the type of file, e.g. document, spreadsheet. The creator field 64 specifies the application which was used to create the file. The flag field may be used to specify other attributes which were not specified in the attribute field. This field is particularly useful on a Macintosh computer where an extension to the attribute field may be needed to specify the attributes of a disk or file. The screen location field specifies the x-y coordinates of where the file is located on the screen. The resources size field specifies the size of the resource and the data size field specifies the size of the data. The file number field specifies a unique number assigned to that file.

Figure 4A:
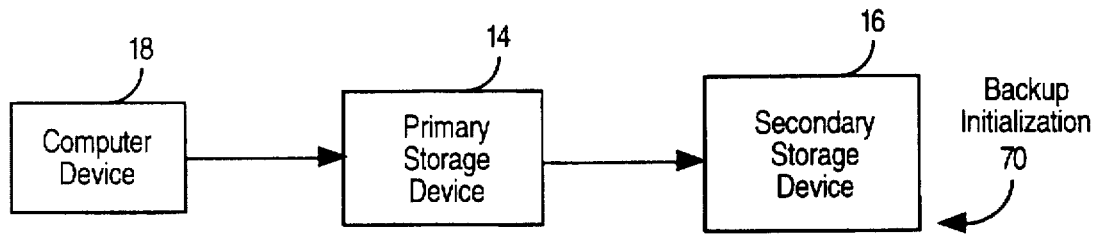
FIGS. 4A-4D describe backup operations for a disk on a computer device.
Figure 4B:
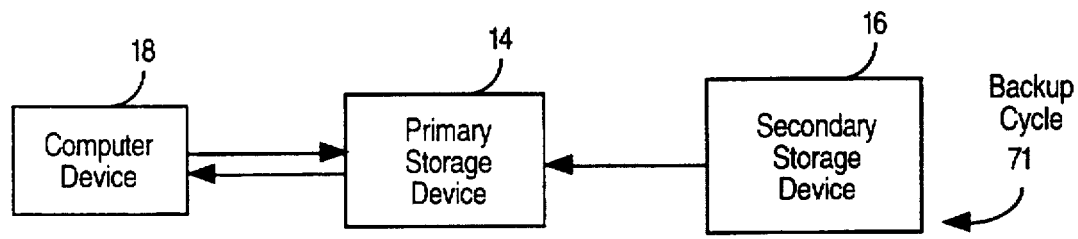
Figure 4C:
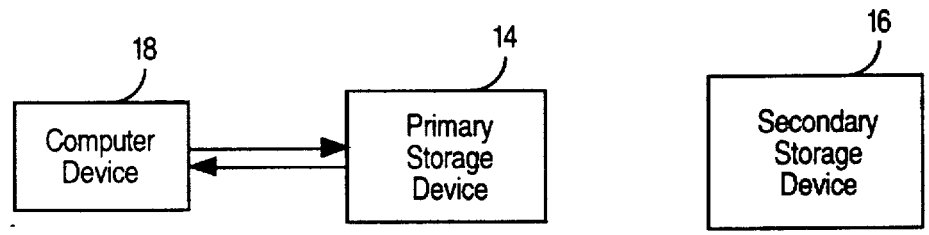
Figure 4D:
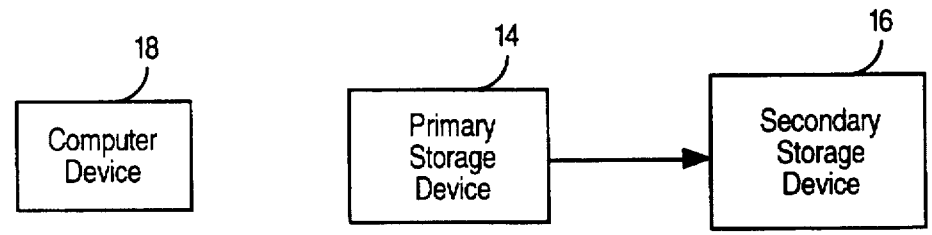

FIGS. 4A-4D show the backup operations for a disk 21 or other storage resource. The backup operations include the backup initialization 70 of a disk 21 (FIG. 4A) and the three states of a backup cycle 71 for that disk (FIGS. 4B-4D). A person of ordinary skill in the art will realize that the initialization 70 and backup cycle 71 can be used on a plurality of disks such as all disks attached to a computer device 18.

FIG. 4A shows the backup initialization 70 of a disk 21. This backup initialization only occurs when no corresponding index or data file exists for that disk on the secondary storage device 16. Typically, this is when a disk 21 or other storage resource first becomes available or accessible on the network. A backup initialization does not occur when a disk 21 is relocated within the network or is otherwise removed from the network and then later added back onto it or even if a different primary storage device 14 becomes responsible for the disk, e.g. the value of indicator 39 is changed.

During the backup initialization 70, a full backup of the disk 21 is performed. This means that data from substantially all of the files and directories on the disk 21 is copied from the computer device 18 to the secondary storage device 16 via the primary storage device 14. Preferably, the primary storage device 14 relays the information to the secondary storage device 16 without retaining a copy in its own memory 32, or in other words, the primary storage device 14 passes the information through to the secondary storage device, thereby eliminating limitations based on the disk size of the primary storage device. Optionally, during the backup initialization, the responsible primary storage device indicator 39 is set to refer to that primary storage device 14. Typically, the secondary storage device retains the full index 36 in memory 34 and the data file 38 on an external device 19.

During the backup initialization, the computer device 18 sends an index entry 50 for each file or directory on disk 21 and data for each file or directory on disk 21. For example, the computer device 18 may send a stream of bytes 80 containing alternating index entries and data for each file. This format may also be used during the backup cycle when a computer device sends index entries and data to a primary storage device. During the backup cycle, however, data for a file is sent from the computer device to the primary storage device only when that file has been changed or created since the last modified date indicated by the primary storage device.

Figures 5A, 5B:
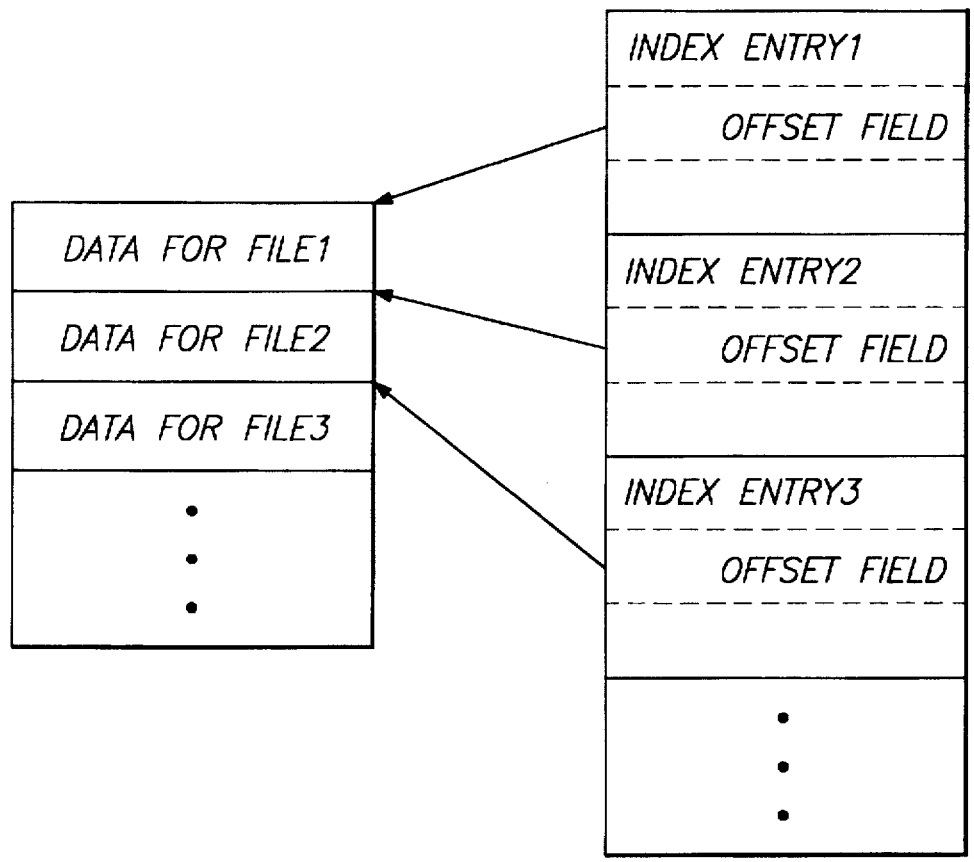
FIG. 5A describes a possible format for information exchanged between devices in the computer backup system shown in FIG. 1.
FIG. 5B describes a full index and a backup data file used by devices in the computer backup system shown in FIG. 1.

FIG. 5A shows an example of a stream of bytes 80 for a disk 21 having three files, file1, file2, and file3. For file1, file2 and file3, index entry1, index entry2 and index entry3 are created, respectively. The primary storage device 14 directly passes the stream of bytes through to the secondary storage device.

As shown in FIG. 5B, the secondary device 16 separates the data from the index entries and forms two files: a backup data file 38 containing the data as a stream of bytes and a full index 36 containing index entry1, index entry2, index entry3. The offset field 56 in index entry1, index entry2, and index entry3 is set to reference the location within the backup data file 38 of file1, file2 and file3, respectively. The specific organization of the stream of bytes 80 is not crucial to the invention, as long as the full index 36 and data file 38 are stored on the secondary storage device 16 or on an external storage device 19 associated with it.

FIG. 4B shows the first state of a backup cycle 71. The first state of a backup cycle 71 occurs after a backup initialization 70, after the third state of a backup cycle (FIG. 4D) and whenever a new primary storage device with no full index or data file for the disk becomes responsible for backing up the disk and the secondary storage device has a full index and backup data file for that disk. The secondary storage device 16 sends a copy of the full index 36 to the primary storage device 14. The primary storage device sends a copy of the full index 36 to the computer device 18. Alternatively, the primary storage device may send only the following information for each file or directory in the full index 36: the file or directory name, the location and modification date. This information corresponds to the identifier field, the location field and the modification date field in an index entry. On computers where the file size can change without the modification date being change, the primary storage device also sends for each file or directory in the full index 36 the file or directory size and the creation date, corresponding to the file size field and the creation date field, respectively. In any event, sufficient information must be passed to the computer device 18 so that it can accurately identify all of the files that have been modified since the earlier backup. After sending the full index or other information to the computer device, the primary storage device does not retain a copy of the full index.

For each file or directory on the disk being backed up, the computer device 18 determines which files or directories have been modified or created since the last modified date for that file or directory indicated by the primary storage device. If a file or directory on the disk is not among those identified by the primary storage device, e.g. it is not identified by any index entry in the full index 36, then the file or directory has been created since the full index 36 on the primary storage device was last modified. If a file or directory is among those identified by the primary storage device, e.g. there is an index entry 50 for the file or directory, then the date on which the file or directory was last modified is compared with the date indicated by the primary storage device as the last modified date, e.g. the last modified field 60 in the index entry 50 for that file.

For each file or directory on the disk 21, the computer device 18 sends an index entry 50 to the primary storage device 14. If a file or directory has been modified or created as previously described, the change status bit 57 in the offset field 56 in the index entry 50 for that file or directory indicates that the file or directory has been changed and sends the data for that file or directory. Otherwise, the change status bit 57 indicates that the file or directory has not been changed and, therefore, no data has been sent.

In the first state of the backup cycle, the primary storage device does not have a full index (it deleted it after sending it to the computer device) or backup data file for the disk. Therefore, it forms a full index 36 and a changed data backup file 38 for that disk. The full index 36 contains the index entries 50 received from the computer device and the changed data backup file 38 contains the associated data received from the computer device.

The offset field 50 within each index entry 50 may be set to refer to the associated data by the computer device or by the primary storage device.

During the first state of a backup cycle the secondary storage device sets the responsible primary storage device indicator 39 associated with the disk to refer to the primary storage device currently performing the backup operations on that disk. Typically, the primary storage device notifies the secondary storage device that it is performing backup operations on a particular disk or other storage device and the secondary storage device sets indicator 39 accordingly.

FIG. 4C shows the second state of a backup cycle 71. During the second state, the primary storage device 14 sends a copy of the full index 36 to the computer device 18. As described above in connection with the first state of the backup cycle, the primary storage device may alternatively send for each file and directory the name of the file or directory, the location of the file and the date the file or directory was last modified. Depending on the type of computer device, the primary storage device may also send the file or directory size and the creation date.

The computer device determines which files and directories listed in the full index, or otherwise designated, were modified or created since the last modified date for that file or directory indicated by the primary storage device. The same steps are used to make this determination as are used to make the same determination in the first state of the backup cycle, previously described.

For each file or directory on the disk 21, the computer device 18 sends an index entry 50 to the primary storage device 14. If a file or directory has been modified or created as previously described, the change status bit 57 in the offset field 56 in the index entry 50 for that file or directory indicates that the file or directory has been changed and sends the data for that file or directory. Otherwise, the change status bit 57 indicates that the file or directory has not been changed and, therefore, no data has been sent.

For clarity in the rest of the description of the second state of the backup cycle, the full index 36 on the primary storage device, a copy of which was sent to the computer device, will be called 36a and the changed data backup file 38 on the primary storage device will be called 38a. The primary storage device 14 forms a new full index 36b containing the index entries 50 received from the computer device and a new changed data backup file 38b containing the associated data received from the computer device.

The primary storage device 14 then performs a merge operation. Using full indices 36a and 36b and changed data backup files 38a and 38b, a new full index 36c and a new changed data backup file 38c are formed such that 36c and 38c describe the modifications to the disk 21 which have occurred since the last backup to the secondary storage device. For each index entry 50 in full index 36b, the primary storage device checks whether the change status bit 57 indicates that the data associated with that index entry indicates that the file or directory has been modified or created.

If the change status bit 57 indicates that the file or directory has been modified or created, then the data for that file or directory in changed data backup file 38b is incorporated into the new changed data backup file 38c, the offset field 56 in that index entry 50 is set to indicate the location of the data for that file or directory in the new changed data backup file 38c, the change status bit 57 in that offset field 56 is set to indicate that the file or directory has been modified or created since the last backup of the disk to the secondary storage device 16 and the index entry 50 from full index 36b is incorporated into new full index 36c. The other fields in the index entry are appropriately filled in with information from the index entry 50 received from the computer device. Information which is not provided in the index entry 50 in full index 36b, can be obtained from the corresponding index entry 50, if one exists, in the full index 36a.

If the change status bit 57 indicates that the file or directory is unchanged, then the offset in the full index 36a is checked to see if data for the file identified by the index entry is in the changed data backup file 38a. If there is, then the data for the file or directory is taken from the changed data backup file 38a. The primary storage device 14 finds the index entry 50 in the full index 36a which refers to the file or directory by searching through the full index 36a for the identifier field 52 identifying that file or directory. The offset field 56 in that index entry indicates the location of the data for that file or directory in the backup data file 38a and the file size field in that index entry indicates the length of that data. Using this information, the primary storage device 16 incorporates the data for the file or directory into the new changed data backup file 38c. The index entry 50 from the full index 36b is incorporated into the new full index 36c. The offset field 56 in the appropriate index entry 50 in the new full index 36c is set to indicate the location of the data in the new backup data file 38c.

After the primary storage device 14 has completed forming the new full index 36c and the new changed data backup file 38c as described above, the primary storage device 14 discards the full indices 36a and 36b and the changed data backup files 38a and 38b. The new full index 36c becomes the full index 36 and the new changed data backup file 38c becomes the backup data file 38.

During the second state of a backup cycle the secondary storage device sets the responsible primary storage device indicator 39 associated with the disk to refer to the primary storage device currently performing the backup operations on that disk. Typically, the primary storage device notifies the secondary storage device that it is performing backup operations on a particular disk or other storage device and the secondary storage device sets indicator 39 accordingly.

The steps described above in relation to the second state of the backup cycle are repeated until a specified, predetermined time or event occurs or a transfer from the primary to the secondary storage device is otherwise indicated.

Rather than forming a new full index 36c, index 36b can be used as long as fields such as the offset field and date modified fields in the index entry are updated accordingly. In any event, the files identified in the full index at the conclusion of the second state merge will match those in index 36b.

FIG. 4D shows the third state of a backup cycle 71. As previously stated, the third state of a backup cycle begins when a specified, predetermined time or event occurs or a transfer operation from the primary to the secondary storage device is otherwise indicated. Preferably, the third state begins when an error condition is encountered, as described by co-pending patent application, "Method and Apparatus for Data Transfer and Storage in a Highly parallel Computer Network Environment", U.S. pat. application Ser. No. 08/006,550, filed concurrently herewith on Jan. 21, 1993, the disclosure of which is herein incorporated by reference. Alternatively, the third state may begin after a specified amount of memory 28 becomes unavailable or after a specified amount of time has lapsed. However, these alternatives may be unsuitable or undesirable for a parallel processing environment. Therefore, it is preferable to use a method and apparatus as described in the above-referenced patent application. A flag or bit in memory 28 may be set to indicate that a transfer from the primary storage device 14 to the secondary storage device 16 should occur.

During the third state, a check is performed to confirm that the primary storage device contacting the secondary storage device about a disk is the most recent primary storage device responsible for that disk. As previously described, this determination can be made by comparing the primary storage device identification to the primary storage device identified by the responsible primary storage indicator 39 for that disk (FIG. 2C). This check can be made after the primary storage device 14 transfers the full index 36 and the changed data backup file 38 to the secondary storage device 16 and if the primary storage device is not the proper one, then full index and the backup data file can be ignored. Alternatively, before actually transferring the information, the primary storage device can request permission from the secondary storage device to make the transfer. The secondary storage device can then check the identification of the primary storage device and grant or deny permission accordingly. Preferably, once the transfer to the secondary storage device is complete or if the primary storage device is denied permission to make the transfer, the full index 36 and the changed data backup file 38 on the primary storage device are deleted.

By checking that the primary storage device is the proper one, the invention permits a computer device and any or all of its disks to be relocated within the network system without substantial modification or notification. For example, in a networked computer system 10 (FIG. 1) having two primary storage devices 14a and 14b and a secondary storage device 16, where a computer device 18 is connected such that primary storage device 14a initiates its backup operations and maintains a data file and a full index for each of its disks 35, computer device 18 may be relocated such that primary storage device 14b handles its backup operations and maintains related files without significant overhead.

To clarify the rest of the description of the third state, the full index 36 and the changed data backup file 38 received from the primary storage device 14 will be referred to as the primary full index 36a and the primary changed data backup file 38a, respectively, and the full index 36 and the full backup data file 38 stored on the secondary storage device will be referred to as the secondary full index 36b and the secondary backup data file 38b, respectively.

The secondary storage device then performs a merge operation similar to the merge performed in the second state of the backup cycle. Using full indices 36a and 36b and backup data files 38a and 38b, the secondary storage device 16 forms a new backup data file 38c. The secondary storage device 16 forms a new full index 36c. For each index entry 50 in the primary full index 36a, the secondary storage device 16 checks to see if the change status bit 57 indicates that the data associated with that index entry has been changed or created since the last backup was performed on the secondary storage device.

If not, then the index entry 50 in the secondary full index 36b which corresponds to the index entry 50 in the primary full index 36a, i.e. the identifier fields in the two index entries specify the same file or directory, is used to access the data associated with that file or directory in the secondary backup data file 38b. Using the offset field 56 and the file size field 58 in the appropriate index entry 50 in the secondary full index 36c, the data for that file or directory is incorporated into the new backup data file 38c. The index entry 50 from the primary full index 36a is incorporated into the new full index 36c. The offset field 56 in the appropriate index entry 50 in the new full index 36c is set to indicate the location of the associated data in the new backup data file 38c.

If the data has been changed or created since the last backup was performed on the secondary storage device, then that index entry 50 from the index 36a is incorporated into the new full index 36c, if a new full index is being formed. The data in changed data backup file 38a associated with that index entry 50 is found by using the offset field 56 and the file size field 58 in that index entry. That data is incorporated into the new backup data file 38c and the offset field 56 in the appropriate index entry in the new full index 36c is set to indicate the location of that data within the new backup data file. The change status bit 57 in the appropriate index entry 50 in the new full index 36c is set to indicate that the data has not been changed.

Preferably, by the end of the third state of a backup cycle, the full index and backup data file for the disk is deleted from the primary storage device 14 memory 32.

Rather than forming a new full index 36c, index 36a can be used as long as fields such as the offset field and date modified fields in the index entry are updated accordingly. In any event, the files identified in the full index at the conclusion of the third state merge will match those in index 36a.

During any backup operation, when a computer device 18 is contacted it may refuse to be backed up at that particular time. For example, to ensure that all computer devices 18 have an equal chance to be serviced by a backup process, the computer device 18 may refuse all backup connections until some minimum period of time has elapsed since it's last backup occurred. In that case, the computer device may refuse backup operations to the primary storage device which are attempted within six hours of the last backup to the primary storage device.

Preferably, the secondary storage device 16 specifies to a primary storage device which disks, computer devices or area on the network to backup and the primary storage device 14 generates processes for performing backup operations on the designated entities. The primary storage device 14 may randomly generate these processes or it may generate them according to a specified method or pattern. For example, a process might be created at specific time intervals, e.g. every second or tenth of a second. The number of processes generated depends on how often the backup operations are to be performed.

Preferably, the processes for performing backup operations are set at a lower priority than other processes which might be executing on a computer device 18. Moreover, a computer device can refuse to be backed up. Thus, backup operations will not significantly interfere with other activity occurring on a computer device 18.

Figures 1, 6A:
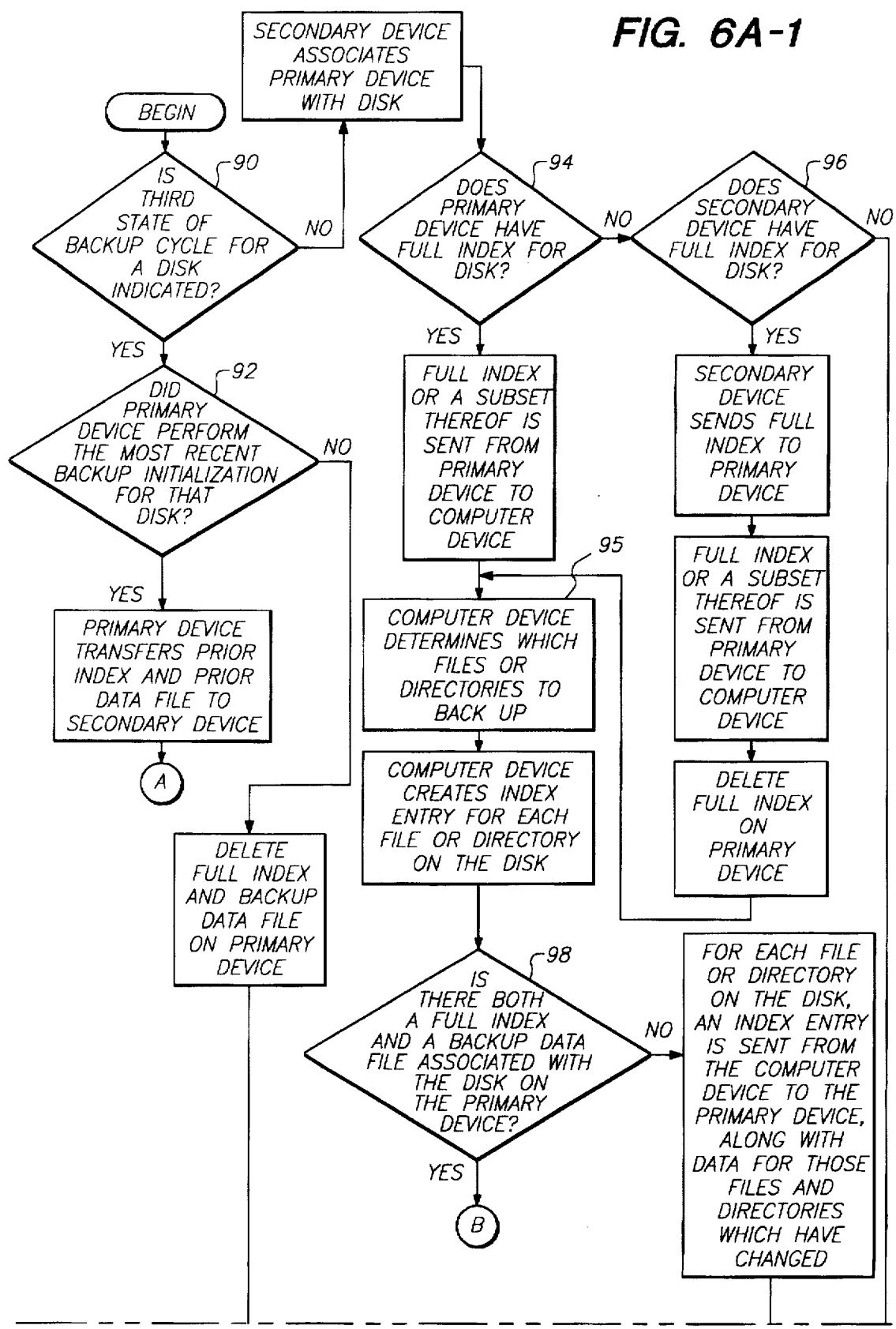
Figure 6C:
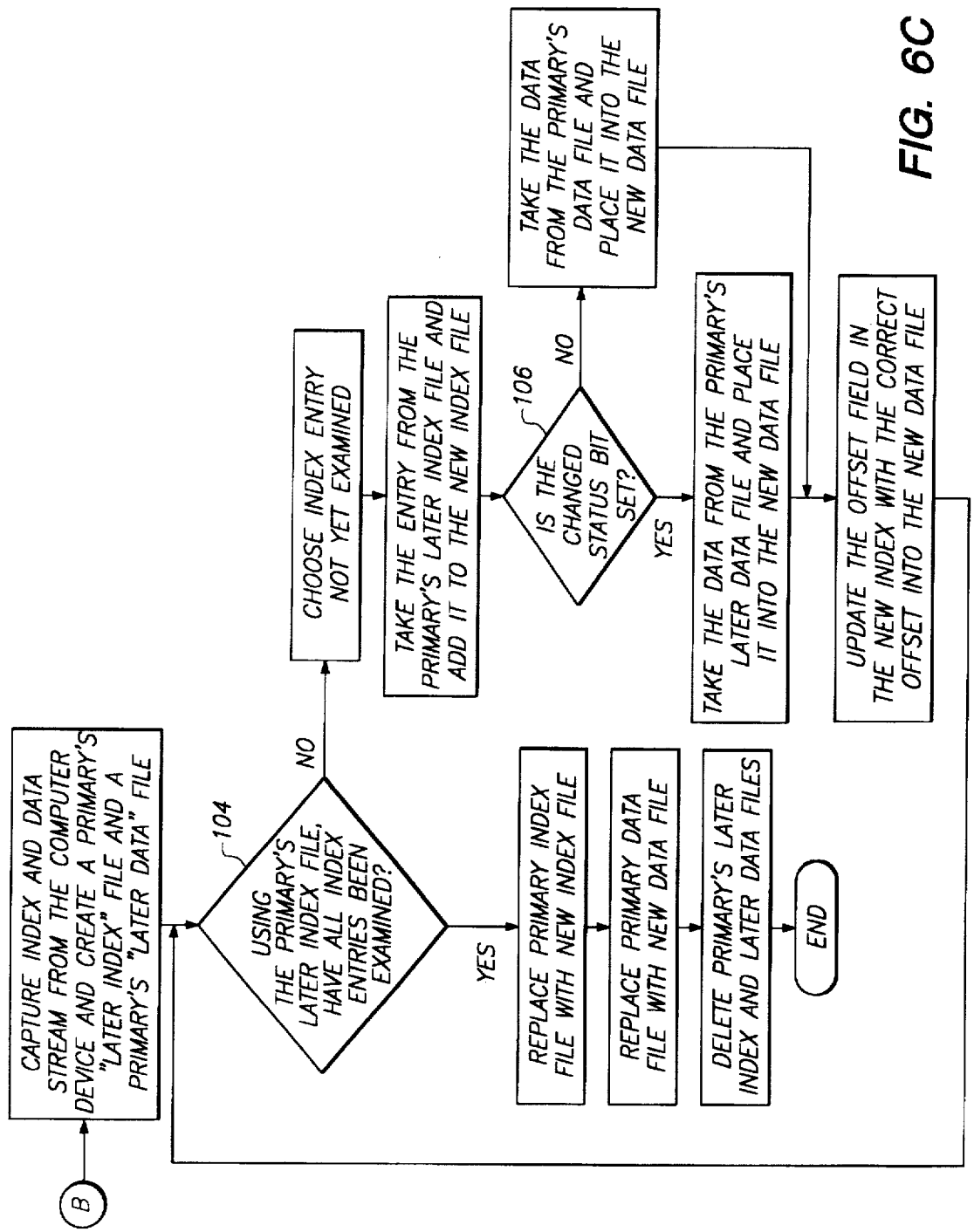

FIGS. 6A–6C are flowcharts showing the steps of backup operations for a disk 21 on a computer device 18. If at decision block 90 it is indicated that a transfer from the primary storage device 14 to the secondary storage device 16 should occur as part of a third state of a backup cycle, then at decision block 92 the secondary storage device 16 confirms that the primary storage device 14 is the one that is responsible for the disk 21. Preferably, the invention includes a mechanism for distinguishing between a transfer from the primary storage device to the secondary storage device during a backup initialization and a transfer which begins a third state of a backup cycle.

If at decision block 92 the primary storage device is not responsible for that disk, then the primary storage device does not transfer the information to the secondary storage device 16 and deletes the full index 36 and the data file 38 from memory 32. If it is, then the full index 36 and the backup data file 38 are transferred from the primary storage device to the secondary storage device 16, as shown in FIG. 6B. At decision block 100, if all of the index entries in the full index from the primary storage device (herein referred to as the "primary index file") have not been examined, then an unexamined index entry is chosen and the index entry from the primary index file is added to the new index file, if a new index file is being formed. If a new index file does not exist, one is created, if desired. Alternatively, rather than creating a new index file, the full index from the primary may be used, as long as the offsets within each index entry are changed to refer to the location of the associated data in the new backup data file which is formed and eventually stored on the secondary storage device.

If, at decision block 102, the changed status bit 57 is set, then the data for that file or directory is taken from the backup data file from the primary storage device (herein referred to as the "primary data file") and added to the new backup data file. Moreover, the index entry is set to indicate the location of that data within the new backup data file. Control then returns to decision block 100.

If at decision block 100, all of the index entries have been examined, then the new index file replaces the full index on the secondary storage device. The new backup data file replaces the backup data file on the secondary storage device (herein referred to as the "primary data file"). The primary index file and the primary data file are deleted from the primary storage device.

Alternatively, the secondary storage device 16 could perform its check at decision block 92 after receiving the full index 36 and data 38 from the primary storage device and then discard the full index and backup data file if the primary storage device is not the one responsible for that disk. The secondary storage device 16 could then notify the primary storage device that it is not the one responsible for that disk and the primary storage device could then delete the full index and backup data file from its memory 32 or the primary storage device could automatically delete the full index and backup data file after transferring it to the secondary storage device.

If a transfer from the primary storage device 14 to the secondary storage device 16 is not indicated at decision block 90, then the secondary storage device associates the primary storage device with the disk. At decision block 94 the primary storage device 14 checks whether it has a full index 36 for that disk 21. If it does, then the primary storage device 14 sends the full index 36 or a subset thereof to the computer device 18. At block 95, the computer device determines which files should be backed up. The computer device 18 sends an index entry for each file and directory on the disk, along with the data for each file and directory which should be backed up to the primary storage device 16.

At decision block 98, it is checked whether there is both a full index and a backup data file associated with the disk on the primary storage device or if the first state of a backup cycle is otherwise indicated. If not, for each file or directory on the disk, an index entry is sent from the computer device to the primary storage device, along with data for those files and directories which have been changed. Then, a new full index is formed from the index entries received from the computer device and a backup data file is formed containing the data received from the computer device. The new full index replaces the full index on the primary storage device.

If at decision block 98 there is both a full index and a backup data file, then a merge operation is performed, as shown in FIG. 6C. The index and data stream 80 from the computer device is captured. A full index (herein called a "later index file") is formed from the index entries received and a backup data file (herein called a "later data file") containing the associated data is formed.

At decision block 104, if all of the index entries in the later index file have not been examined, an unexamined index entry is selected. The index entry is taken from the primary's later index file and added to the new index file. At decision block 106, if the changed status bit is set, then the data associated with the index entry from the primary's later data file is placed into the new data file. If a new data file does not exist, one is created. If at decision block 106, the changed status bit is not set, the data associated with the index entry from the primary's backup data file is placed into the new data file. In either case, the index entry in the new full index is set to indicate the location in the new backup data file of the data for the file identified by that index entry. Control then returns to decision block 104.

If at decision block 104 all of the index entries have been examined, then the new full index replaces the primary index file and the new backup data file replaces the primary backup data file. The primary's later index file and later data file are deleted.

If at decision block 94 the primary storage device 14 does not have a full index 36 for that disk 21, then it requests that the secondary storage device 16 send it a copy of the full index 36. If at decision block 96 the secondary storage device 16 has a full index 36, it sends a copy of the full index 36 to the primary storage device 14 in response to its request. Then the full index or a subset thereof is sent from the primary storage device to the computer device. Then the full index on the primary storage device is deleted and control passes to block 95.

If the secondary storage device 16 does not have a full index 36, then it requests data and index entries from the computer device 18, either directly or via the primary storage device 14. The computer device 18 sends data and index entries for the files on the disk 21 to the primary storage device 14. The primary storage device passes the index entries and data directly through to the secondary storage device. The secondary storage device 14 creates a backup data file 38 containing the data and a full index 36 containing the index entries 50. The secondary storage device 14 fills in relevant information in the index entries such as the offset of the data in the backup data file 38.

In some networked computer systems 10 (FIG. 1), the computer devices are organized into convenient groupings called "zones". Typically, a computer device can belong to only one zone at any particular point in time.

Preferably, a zone is assigned to a particular primary storage device such that at any time there is a single primary storage device responsible for that zone. For example, in a network having two zones A and B and two primary storage devices C and D, zone A might be assigned to primary storage device C, while zone B is assigned to primary storage device D. In that case, primary storage device C will perform backup operations for zone A, but not zone B. Likewise, primary storage device D will backup zone B and not zones A. Primary storage devices D and E may create multiple parallel processes to perform the backups of the zones which are assigned to them. A zone may be reassigned to a different primary storage device as long as it is not assigned to two different primary storage devices at the same time.

When computer devices are organized into zones or other groupings, the secondary storage device may keep track of the primary storage device responsible for a with particular zone and the particular computer devices and disks within that zone or other grouping. This information may then be used to determine whether a paticular primary storage device is the primary storage device which is responsible for a particular disk.

Figure 7:
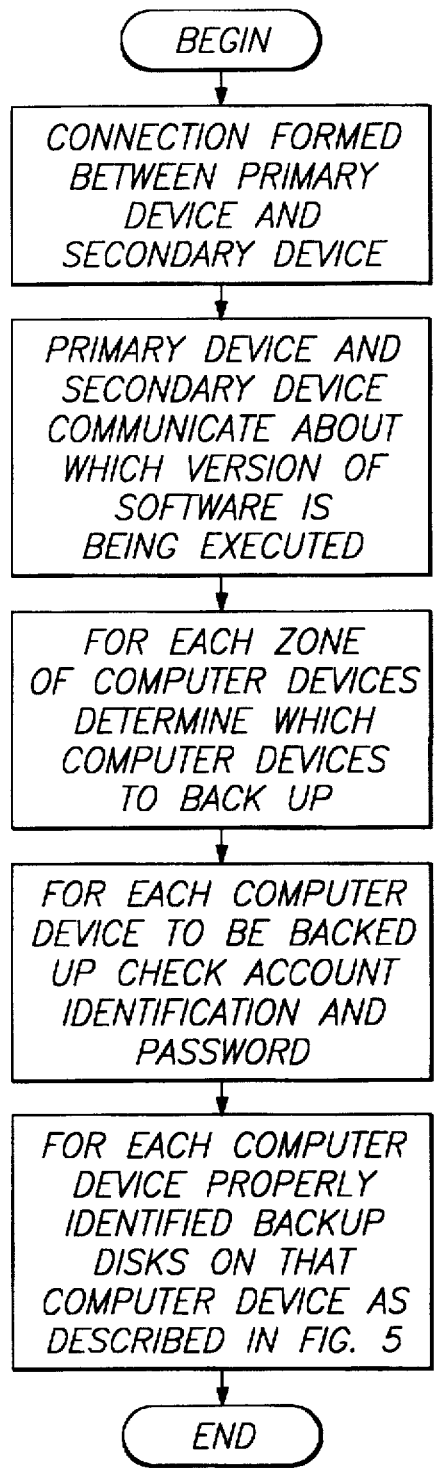
FIG. 7 is a flowchart specifying steps executed to backup a plurality of computer devices organized into zones.

FIG. 7 is a flowchart showing the steps involved in executing backup cycles for a plurality of interconnected computer devices 18 in a networked computer system organized into zones. First, the primary storage device 14 initiates a connection with the secondary storage device 16. Preferably, the secondary storage device 16 then requests that the primary storage device 14 identify which version of software it is executing and the primary storage device 14 responds to that request. If the secondary storage device is not "aware" of the zones on the network, it requests that the primary storage device determine which zones are the network. After receiving that information, the secondary storage device requests that the primary storage device back up a specific zone. The primary storage device determines which computer devices in that zone should be backed up and records their network addresses.

Preferably, a computer device has an account on the secondary storage device 16 which requires password verification to use. For each computer device with an account, a password is exchanged before a computer is backed up. Then for each computer device having an account and supplying an appropriate password, each disk on that computer device is backed up in accordance with the steps described in FIGS. 5 and 6.

The backup system includes a command protocol for interactions between a computer device 18, a primary storage device 14 and a secondary storage device 16. This command protocol includes commands to exchange information about which backup operation is being performed, which version of software is executing, which zones are on a network, which zone should be backed up, and for transferring a full index 36, an index entry 50 or a backup data file 38.

The foregoing description has used a specific embodiment of this invention. It will be apparent, however, that variations and modifications may be made to the invention with the attainment of some or all of its advantages. Therefore, it is the object of the appended claims to cover all such variations and modifications as come within the true spirit and scope of the invention.

We claim:

1. In a networked computer system having a communication network interconnecting one or more primary storage devices, one or more secondary storage devices and a plurality of computer devices, each computer device having one or more disks, a method for storing data from one or more computer devices, said method comprising the steps of:

indicating when a transfer of data from a primary storage device to a secondary storage device should occur;

transferring data from the primary storage device to the secondary storage device in response to such indicating, the data including for a particular disk a corresponding full index and a backup data file, the data being merged, respectively, with any full index and backup data file for the disk currently stored on the secondary storage device, the merged any full index and backup data file corresponding to the particular disk, the data being merged in such a way so that if an index entry in the full index from a computer indicates that data corresponding to that index entry has been changed or created, the corresponding data in a resulting backup data file is the corresponding data from the backup data file from the primary storage device and if an index entry in the full index from the computer indicates that data corresponding to that index entry has been changed or created, the corresponding data in the resulting backup data file is the corresponding data from a previously-stored backup data file;

checking whether the primary storage device has a full index corresponding to a disk of a computer device and, if the primary storage device has such a corresponding full index, then sending the corresponding full index, or a portion thereof, to the primary storage device and, if the primary storage device does not have such a corresponding full index, then checking to see if the secondary storage device has such a full index corresponding to the disk and, if the secondary storage device does have such a corresponding full index, sending directly or indirectly that corresponding full index to the computer device and if the secondary storage device does not have a copy of such corresponding full index, copying data and corresponding information from the disk to the secondary storage device, storing the data in a backup data file on the secondary storage device or external storage devices connected thereto, creating a corresponding full index for accessing the data in the backup data file on the secondary storage device and storing that corresponding full index on the secondary storage device;

determining which data on the disk of the computer device has been changed or created since the last time the corresponding full index for that disk was modified;

creating an index entry for each file or directory on the disk;

sending index entries and a copy of the determined data to the primary storage device; and forming on the primary storage device a new corresponding full index and new corresponding backup data file for the disk from the index entries and data received from the computer device and the corresponding full index and backup data file, if any, on the primary storage device.

2. The method as defined in claim 1 further comprising a step of creating two or more parallel processes to perform steps defined in claim 1.

3. The method as defined in claim 1 further comprising the steps of:

assigning a responsible primary storage device to a disk such that the primary storage device receives data from the disk;

checking that the primary storage device sending data related to a disk to the secondary storage device in response to the indicating of a data transfer is the responsible primary storage device; and discarding the data if the primary storage device is not the responsible primary storage device assigned to the disk.

4. The method as defined in claim 1 further comprising the steps of:

checking for a specific condition at each attempt to perform a backup operation for a disk; and performing the attempted backup operation only if the specific condition has occurred.

5. The method as defined in claim 1 further comprising the steps of:

setting a minimum time between backups for a disk on a computer device;

recording when a computer device sends index entries and data for a disk to a primary storage device;

accessing a current date and time;

checking at each attempt to perform a transfer of data for a disk whether the minimum time between backups for a disk elapsed since the computer device last sent index entries and data for a disk to a primary storage device; and performing the attempted data transfer only if the minimum time has elapsed.

6. In a networked computer system having a communication network interconnecting one or more primary storage devices, one or more secondary storage devices and a plurality of computer devices, each computer device having one or more disks, a method for storing data from one or more computer devices, said method comprising the steps of:

indicating when a transfer of data from a primary storage device to a secondary storage device should occur; and for each disk, creating index entries for data on a computer device, each index entry specifying a corresponding portion of the data, sending a copy of data and associated index entries from the computer device to the secondary storage device using the primary storage device without storing the data or index entries on the primary storage device, storing the data in a backup data file on the secondary storage device, the backup data file corresponding to the disk from which the data was transferred, forming an index from the index entries such that each index entry specifies a location within the backup data file where data associated with that index entry is located, the index corresponding to the disk from which the data was transferred, storing the index for a disk on the secondary storage device, sending an index for the disk from the secondary storage device to the primary storage device and storing the index on the primary storage device, indicating to the computer device which files on the disk are identified in the index on the primary storage device and when those files were last modified, determining which files on the disk have been changed or created since the last modified dates of the files indicated by primary storage device, sending an index entry for each file on the disk from the computer device to the primary storage device, each index entry indicating the location of the data corresponding to said each index entry, sending data for the files which have been changed or created from the computer device to the primary storage device, if there is not an index and a backup data file corresponding to the disk on the primary storage device, forming an index containing the index entries from the computer device and forming a backup data file containing the data from the computer device, the formed index and backup data file corresponding to the disk, if there is an index and a backup data file corresponding to the disk, then forming a new index containing the index entries from the computer device, forming a new backup data file, checking each index entry in the new index to see if the data associated with that entry has been changed and, if it has, then incorporating the associated data in the backup data file received from the computer device into the new backup data file, and if it has not been changed, then incorporating the associated data in the backup data file on the primary storage device into the new backup data file, and transferring in response to said indicating step one or more backup data files and index corresponding to the disk from the primary storage device to the secondary storage device, replacing the index on the secondary storage device with the index received from the primary storage device, forming a new backup data file, checking each index entry in the new index to see if the data corresponding to that entry has been changed and, if it has, then incorporating the corresponding data in the backup data file received from the primary storage device into the formed new backup data file, and if it has not been changed, then incorporating the corresponding data in the backup data file on the secondary storage device into the formed new backup data file.

7. The method as defined in claim 6 further comprising a step of creating two or more-parallel processes to perform steps defined in claim 6.

8. The method as defined in claim 6 further comprising the steps of:

assigning a responsible primary storage device to a disk such that the primary storage device receives data from the disk;

checking that the primary storage device sending data related to a disk to the secondary storage device in response to the indicating of a data transfer-is the responsible-primary storage device; and discarding the data if the primary storage device is not the responsible primary storage device assigned to the disk.

9. The method as defined in claim 6 further comprising the steps of:

checking for a specific condition at each attempt to perform a backup operation for a disk; and performing the attempted backup operation only if the specific condition has occurred.

10. The method as defined in claim 6 further comprising the steps of:

setting a minimum time between backups for a disk on a computer device;

recording when a computer device sends index entries and data for a disk to a primary storage device;

accessing a current date and time;

checking at each attempt to perform a backup operation for a disk whether the minimum time between backups for a disk elapsed since the computer device last sent index entries and data for a disk to a primary storage device; and performing the attempted backup operation only if the minimum time has elapsed.

11. An apparatus for storing archival data from one or more computer devices, each computer device having at least one disk, said apparatus comprising:

a primary storage device;

a secondary storage device;

means for interconnecting said primary storage device, said secondary storage device and the computer devices;

transfer indicating-means for indicating a transfer from said primary storage device to said secondary storage device;

a full index having a plurality of index entries, each index entry specifying corresponding data;

a backup initialization having means for sending a copy of data and corresponding index entries for a disk from the computer device to the primary storage device, means for passing the data and corresponding index entries through the primary storage device to the secondary storage device without storing the data or index entries on the primary storage device, means for storing the data in a backup data file on the secondary storage device, means for forming an index from the index entries such that each index entry specifies a location within the backup data file where data associated with that index entry is located; and a backup cycle having a first state having means for sending an index from the secondary storage device to the primary storage device, computer device indicating-means for indicating to the computer device which files are identified in the full index on the primary storage device and the last modified date specified in the index entry for each file, means for determining which files on the computer device have been changed or created since the last modified date indicated in the index entry for that file in the full index on the primary device, file change indicating means for indicating that the file has been changed or created, means for sending an index entry for each file on the disk and data for the files which have changed from the computer device to the primary storage device, means for discarding the full index on the primary storage device, means for forming a new index containing the index entries from the computer device, and means for forming a backup data file containing the data, a second state having computer device indicating means for indicating to the computer device which files are identified in the full index on the primary storage device and the last modified date specified in the index entry for each file, means for determining which files on the computer device have been changed or created since the last modified date indicated in the index entry for that file in the full index on the primary device, file change indicating means for indicating that the file has been changed or created, means for sending an index entry for each file on the disk and data for the files which have changed from the computer device to the primary storage device, means for forming a new index containing the index entries from the computer device and a new backup data file by checking each index entry received from the computer device to see if the data associated with that entry has been changed and, if it has, then incorporating the associated data in the backup data file received from the computer device into the new backup data file, and if it has not been changed, then incorporating the associated data in the backup data file on the primary storage device into the new backup data file; and a third state having means for responding to said indicating means by transferring one or more backup data files and index associated with the disk from the primary storage device to the secondary storage device, means for replacing the index on the secondary storage device with the index received from the primary storage device, and means for forming a new backup data file by checking each index entry in the new index to see if the data associated with that entry has been changed and, if it has, then incorporating the associated data in the backup data file received from the primary storage device into a new backup data file, and if it has not been changed, then incorporating the associated data in the backup data file on the secondary storage device into a new backup data file.

12. The apparatus as defined in claim 11 wherein said interconnecting means is a communication network.

13. The apparatus as defined in claim 11 further including means for creating parallel processes to perform the backup initialization and the backup cycle.

14. The apparatus as defined in claim 11 wherein an index entry comprises:

a first field identifying a file;

a second field specifying a location of the file on a disk on the computer device;

a third field specifying a location of data associated with the file in a backup data file;

a fourth field specifying a length of the file identified by said first field; and a fifth field indicating when the file was last modified.

15. In a networked computer system having a communication network interconnecting one or more primary storage devices, one or more secondary storage devices and a plurality of computer devices, each computer device having one or more storage resources, a method for transferring data from one or more of the storage resources, said method comprising the steps of:

initiating and controlling two or more concurrent processes by each active primary storage device, wherein each process initiates a connection between a computer device and a secondary storage device;

indicating when a transfer of data from the primary storage device to the secondary storage device should occur;

transferring data from the primary storage device to the secondary storage device in response to such indicating;

forming for a storage resource of a computer device a new index and a corresponding data file on a secondary storage device by comparing and merging data from a primary storage device index and data files with previously-existing index and data file corresponding to the storage resource, said previously-existing index and data file being stored on the secondary storage device;

checking whether the primary storage device has an index that defines the data from the storage resource;

if the primary storage device does not have the index, checking to see if the secondary storage device has such an index;

if the secondary storage device has a version of the index, sending a copy of the secondary storage device version of the index to the computer device via the primary storage device, if the secondary storage device does not have such an index, copying data and corresponding information from the storage resource of the computer device to the secondary storage device, storing the data in a data file on the secondary storage device or external storage devices connected to the secondary storage device, creating an index for accessing the data in the backup data file, and storing a copy of the index from the computer device on the secondary storage device;

determining which data on the storage resource to update;

creating an index entry for the determined data;

sending index entries and a copy of the determined data to the primary storage device; and forming a new index and a new corresponding data file on the primary storage device by comparing and merging newly-acquired determined data from the computer device contained in the most recent index and data files with the previously existing index and data files already stored on the primary storage device.

16. In a networked computer system having a communication network interconnecting a plurality of devices, the devices including one or more primary storage devices, one or more secondary storage devices and a plurality of computer devices, each computer device having one or more storage resources, a method for transferring among the devices data from the storage resources, said plurality of devices capable of creating a plurality of parallel processes, said method comprising the steps of:

assigning a secondary storage device to a storage resource;

performing a backup initialization operation for the storage resource from which data is being transferred, the backup initialization operation forming a first full index and a first backup data file for each storage resource being stored on a secondary storage device;

repeatedly performing backup cycles for the storage resource from which data is being transferred, during each backup cycle, determining from which files and directories on the storage resource data should be transferred;

transferring from the computer device of the storage resource a second full index for the storage resource, the second full index having an entry for each file and directory on the storage resource, and a second backup data file for the storage resource, the second backup data file including data for the determined storage resource's files and directories, and storing the second full index and the second backup data file on the primary storage device, incorporating the second full index and the second backup data file with a previously-stored second full index and a previously-stored second backup data file, if any exist, on the primary storage device, the backup cycles being repeatedly performed until a transfer of data from the primary storage device is indicated;

indicating when a transfer of data from the primary storage device to a secondary storage device should occur;

transferring data from the primary storage device to the secondary storage device in response to such indicating, the data comprising with respect to a particular storage resource, the second full index and the second backup data file stored on the primary storage device;

incorporating the data transferred from the primary storage device into the first full index and the first backup data file stored on the secondary storage device to produce a new first full index having an index entry for each file and directory on the storage resource and a new first backup data file having data for each file and directory, the data for a particular index entry being from the second backup data file if the second backup data file contains data for that particular index entry and being from the first backup data file if the second backup data file does not contain data for that particular index entry; and storing the new first full index and the new first backup data file on the secondary storage device.

17. The method of claim 16 further comprising the step of creating parallel processes to repeatedly perform the steps of claim 16 for multiple storage resources.

18. The method of claim 16 wherein the determination as to which data to transfer for a storage resource is based on which files and directories have been changed or created since a last transfer of data from the primary storage device to the assigned secondary storage device of the storage resource, such that the data of those files and directories are determined as the data to be transferred.

19. The method of claim 16 wherein the step of indicating a transfer from the primary storage device to the secondary storage device occurs at specified time intervals.

* * * * *